United States Patent [19]

Sadjadi et al.

[11] Patent Number: 5,369,599
[45] Date of Patent: Nov. 29, 1994

[54] SIGNAL METRIC ESTIMATOR

[75] Inventors: Firooz A. Sadjadi, St. Anthony; Mike E. Bazakos, Bloomington, both of Minn.; Hatem Nasr, Houston, Tex.

[73] Assignee: Honeywell Inc., Minneapolis, Minn.

[21] Appl. No.: 925,058

[22] Filed: Aug. 4, 1992

[51] Int. Cl.$^5$ .............................................. G01S 13/04
[52] U.S. Cl. ..................................... 364/516; 322/39
[58] Field of Search ..................... 364/516; 382/17, 28, 382/27, 15, 39

[56] References Cited

U.S. PATENT DOCUMENTS

| | | | |
|---|---|---|---|
| 4,229,797 | 10/1980 | Ledley | 382/28 |
| 4,853,970 | 8/1989 | Ott et al. | 382/27 |
| 4,998,286 | 3/1991 | Tsujiuchi et al. | 382/17 |
| 5,231,483 | 7/1993 | Sieber et al. | 364/516 |
| 5,233,541 | 8/1993 | Corwin et al. | 364/516 |

FOREIGN PATENT DOCUMENTS 2212961 2/1989 United Kingdom ................ 364/516

*Primary Examiner*—Jack B. Harvey
*Assistant Examiner*—Thomas Peeso
*Attorney, Agent, or Firm*—Gregory A. Bruns

[57] ABSTRACT

A performance measure of an ATR is made from ancillary target data and the ATR output. A parameter of the ATR is varied to determine the change an ATR performance due to the parameter variation. Separate performance in the form of a quadratic equation models provide performance as a function of parameter and metrics. The performance model is partially differentiated with respect to the parameter. The partial differentiation allows solution for the estimated metric.

9 Claims, 2 Drawing Sheets

SIGNAL/IMAGE METRIC ESTIMATION

ROLE OF IMAGE METRICS IN ATR PERFORMANCE CHARACTERIZATION

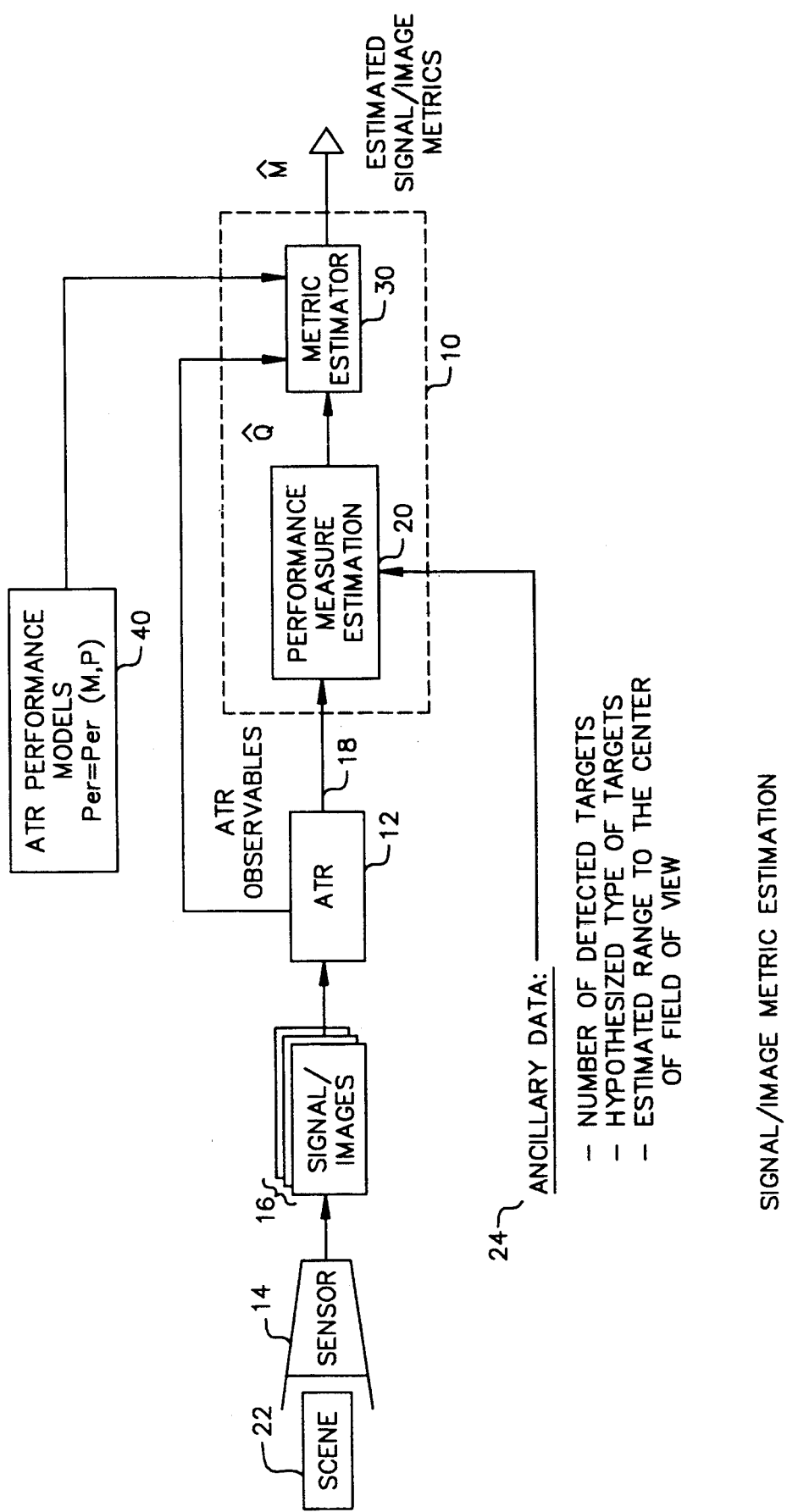

SIGNAL METRIC ESTIMATOR

BACKGROUND OF THE INVENTION

The present invention relates to signal and image processing systems such as Automatic Target Recognition (ATR) systems used for target classification and target tracking and Automatic Object Recognition (AOR) systems. The input to these ATR systems could be signals or images of scenes collected from Electro-Optical (EO) sensors, or Radar (RF) sensors or other signal or image generating sensors.

In signal and image processing systems, the signal metrics are the measures of the quality of the signal and consequently they convey information about the scene, the objects in the scene, the sensor, the signal transmission path, and the environmental conditions under which the signal was obtained. These metrics may be divided into the classes of Global Metrics, Local Metrics and Object or Target Metrics. The scene complexity is an example of the Global Metrics. An example of the local metrics is the contrast ratio between objects in the scene and their immediate backgrounds. Target entropy is an example of the object metrics.

It is to be understood that the signal metrics is a more generic term than image metrics and that the principles of the present invention apply to both signal metrics and image metrics even though specific examples will be given in terms of image metrics. In the past the approach used to arrive at the image metrics was a manual approach as illustrated in FIG. 1. In this approach one examines the signal or image for the case of two-dimensional signals and through the use of extensive ground truth information identifies all of the knowable aspects of the scene. The knowable aspects include, for example, the location of the objects in the scene, the type targets or objects and their orientation, the range from the sensor to the objects and to the various regions in the image and other knowable aspects of the scene. The image metrics are then computed in an organized fashion by examining each object separately. An example of a local metric is Target Interference Ratio (TIR) squared. The approach to calculating (TIR) begins by placing a minimum bounding rectangle (MBR) around each object. The metric $(TIR)^2$ is defined as the squared ratio of the difference between the average of target intensity value and the average intensity value of the background as obtained in a rectangular box twice the size of the MBR that surrounds the MBR, and the variance of the intensity values of the background. It should be obvious that to obtain the metrics as just described requires tedious and extensive ground truthing and manual computation. These requirements make the manual computation tedious in the best situations where the extensive ground truth data is available. In the real world situation the above described approach is impractical because the location of the targets and their identities are unknown.

In the past large sets of data have been collected with AOR systems; however it has not been practical to communicate the important features of this data to other users of AOR systems so that useful collected data could be exchanged. This is because the data has not been characterized. In the past this characterization could only be done by the tedious ground truthing process already described.

SUMMARY OF THE INVENTION

The present invention solves these and other needs by providing estimated signal metrics without requiring direct computation of the signal metrics. It is not necessary to relate images to ground truth information to determine the estimated metrics.

The present invention utilizes an ATR and estimates the ATR performance from the ATR output or ATR observables and a minimum amount of ancillary data. For example ancillary data may include the number of detected targets, the hypothesized type of targets, and the estimated range to the center of field of view. Performance models provide the ATR performance as a function of ATR parameters and metrics. The present invention inverts the performance models by differentiating the performance models with respect to algorithm parameters. Then by using the value for the rate of change of the variation of performance with respect to an algorithm parameter as determined by varying an ATR parameter, the value for the parameter and the coefficients of the performance models, the signal metrics associated with the signal are estimated.

BRIEF DESCRIPTION OF THE DRAWINGS

FIG. 3 illustrates in block diagram form the signal or image metric estimator of the present invention.

DETAILED DESCRIPTION OF THE PREFERRED EMBODIMENT

A Knowledge and Model Based Adaptive Signal Processor (KMBASP) is described in U.S. Pat. No. 5,018,215 which was issued on May 21, 1991 and is assigned to the same assignee as the present invention. U.S. Pat. No. 5,018,215 is hereby incorporated by reference. In the Knowledge and Model Based Adaptive Signal Processor (KMBASP) the performance model was estimated as a quadratic polynomial which is consistent with extensive experience with the performance of many targeting systems. The coefficients of the polynomial were determined by fitting the model to empirical data. A set of three such performance models for Probability of Detection (PD), False Alarm Rate (FAR), and Segmentation Accuracy (SA) were developed as part of the KMBASP models. In these models three targeting system parameters and three image metrics were used. The ATR system under consideration is the Multi-function Target Acquisition Processor (MTAP) system. The image metrics used were selected based on previous experience and included the results obtained in the PAIRSTECH project. These metrics are: Target Interference Ratio squared $(TIR)^2$ as a measure of the local contrast of the targets; Edge Strength Ratio (ESR), as a measure of quality of the target edges; and target range in the form of number of pixels on target.

Figure 1:
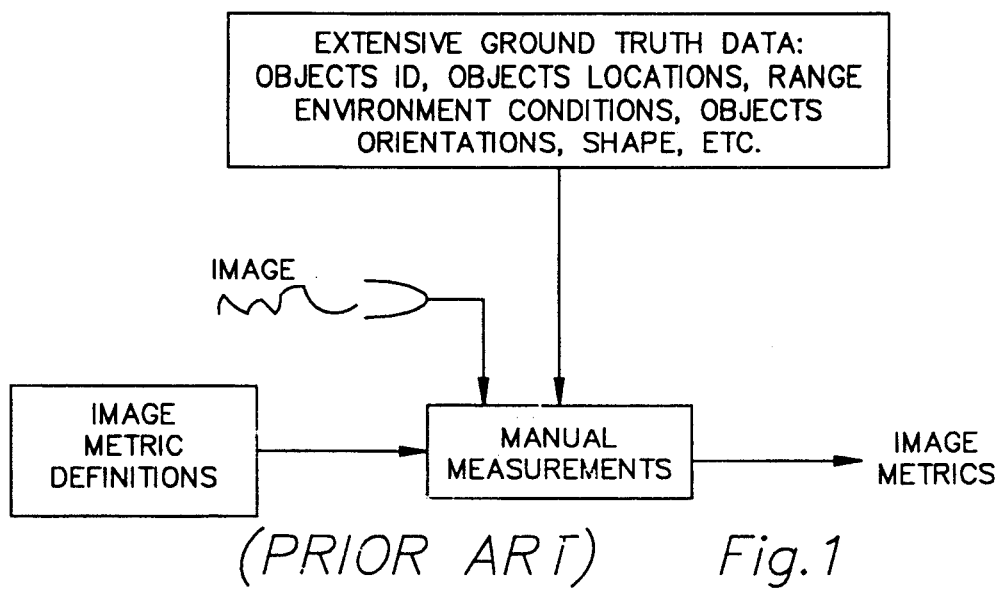
FIG. 1 illustrates the manual approach of the prior art to computing image metrics.
Figure 2:
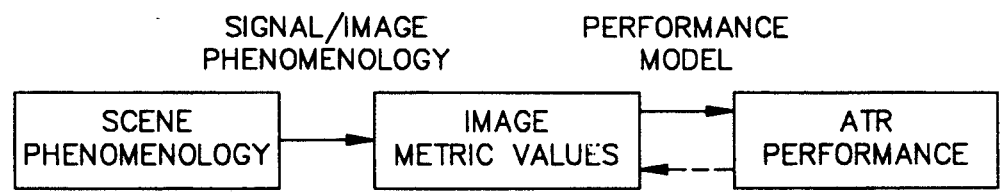
FIG. 2 illustrates the automated approach for metric computation of the present invention.

FIG. 1 simply illustrates the signal or image metrics concept.

A Signal Metric Estimator (SME) is shown in the drawings and generally designated 10. FIG. 3 shows integration of SME 10 with ATR system 12. Sensor 14 provides sensory data or images 16 of scene 22 to ATR 12. ATR 12 receives a group of sequential signals or images 16 and provides ATR observables 18 to SME 10. SME 10 includes two major functional modules Performance Measure Estimator 20 and Metric Estimator 30. Ancillary Data Module 24 provides non-sensory informational scene data such as the number of detected targets, hypothesized type of targets, and estimated range to the center of field of view to performance measure estimator 20. Sensory data is defined as data obtained from the signal for image producing apparatus and non-sensory data is data not obtained from the signal or image producing apparatus.

The operation of Performance Estimator 20 will now be described. After a few (typically 5 to 10) images are processed by ATR 12 for a fixed set of algorithms, then a set of performance measures are estimated from the output of ATR 12. Examples of performance measures are probability of detection (PD) and False Alarm Rate (FAR). In addition, the AOR output provides the estimated target locations, their labels and aspect angles.

For illustration purposes assume that the ancillary data indicates that 10 targets are present in the scene and that after performance estimator 20 has processed a few frames, it determines that 8 objects have been successfully tracked. This determination is made by using only the motion of the objects i.e. there is no ground truth available. The AOR may be operating at up to 30 image frames per second and it may require that an object be tracked in 27 out of 30 frames to be classified as an object. By successfully tracked it is meant that the frequency of the object being tracked has exceeded a threshold value so that the object is classified as a target. In this illustration, the PD would be 0.8. Note that for this estimation, multiple runs of data are used. If the ATR is a single frame processor the output of classifier or recognition modules are used to estimate the performance measures. In summary the ATR performance is estimated by using: 1) Frequency of a target being tracked exceeding a threshold value level, 2) objects that are estimated to be true detects should be classified as belonging to the same class of targets on "majority" of times, i.e., frequency of belonging to the same class exceeds a threshold value.

It should be noted that there are several types of errors that may occur in this performance measure estimation: 1) When a target is missed and never acquired or acquired very infrequently, e.g., it is below the set threshold, 2) when a false target is declared a true target by passing all of the true target tests. It is therefore important to set the test requirements in such a way as to reduce errors 1 and 2.

Performance models 40 are mathematical models that have been obtained empirically. U.S. Pat. No. 5,018,215 describes the development of robust performance models for the Multi Function Target Acquisition Processor (MTAP) detection and segmentation modules. These models can be generally represented as the following:

$$Q = Per = Per(M, P) \qquad (1)$$

where Q stands for Performance Measures
Per stands for Performance Measures,
M stands for Image metrics
P stands for algorithm parameters The present invention is concerned with using relationship (1) to obtain the image or signal metric (M) as a function of Performance Measures (Q) and Parameters (P). In U.S. Pat. No. 5,018,215 the performance model was estimated as a quadratic polynomial which is consistent with the inventors experience with many targeting systems performance. For illustration purposes, let Q be a quadratic function of P and M, which for simplicity we assume to be scalars. Then $$Q = aP^2 = bM^2 = cPM = dP = eM = f$$

where a, b, c, d, e and f are real coefficients

By taking a partial derivative of Performance measure (Q) with respect to Parameter (P), $$M = \frac{\frac{\partial Q}{\partial P} - 2aP - d}{c}$$

when c is not zero, which is the case for our BACORE models. Where BACORE is the detector, segment or module of MTAP. Thus M can be obtained from an estimate of $$\frac{\partial Q}{\partial P}$$

at specific values of P, given the coefficients of the model.

Figure 4:
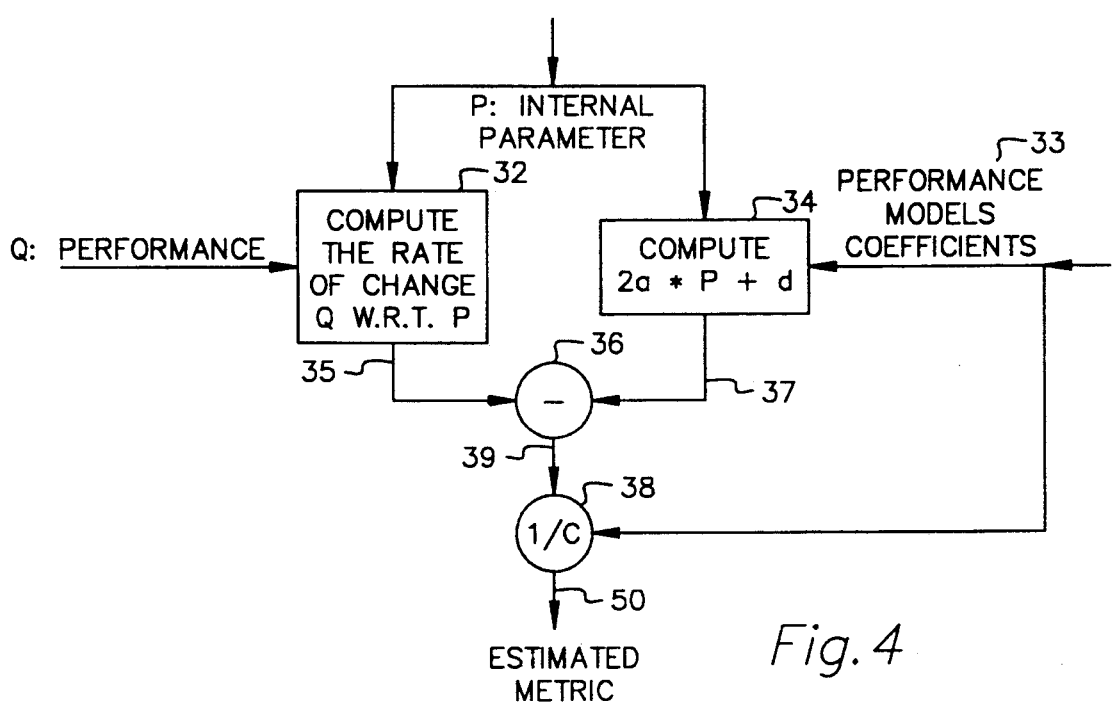
FIG. 4 illustrates the metric estimator portion of the present invention.

The determination of the partial derivative according to the present invention is determined numerically as illustrated in FIG. 4. Rate of change submodule 32 has as its input, Estimated Performance of ATR 12, and an internal parameter (P). The procedure is to vary an internal parameter (P) by a small amount ($\Delta P$). Submodule 32 then computes the rate of change of ATR 12 performance with respect to P. Coefficient submodule 34 has as its input internal parameter (P) and performance model coefficients. Performance model coefficients are determined from performance models. Performance models are mathematical surfaces that have been determined empirically and represent the performance of the AOR of interest For example if the performance measure of interest is segmentation accuracy (SA), then a model of segmentation accuracy as a function of certain parameters and metrics is needed. Performance models such as those described in U.S. Pat. No. 5,018,215 could be used or other performance models having fewer coefficients may be used in the present invention.

Coefficient submodule 34 performs the multiplication of coefficient 2a times parameter P and adds the result to coefficient d to provide output 37. The value of P used is the value before P is varied by $\Delta P$. Submodule 36 subtracts output 37 from the rate of change of Q with respect to P from rate of change module 32 and provides output 39. Submodule 38 divides output 39 of submodule 36 by coefficient c to provide the estimated metric 50.

The present invention has been described in terms of scalar models for ease of understanding. Those of ordinary skill in the art will understand that the principles of the present invention easily can be extended to vector models.

Now that the basic operation of Signal Metric Estimator 10 has been set forth, many subtle features and advantages may be set forth and appreciated. For example, while the illustrations used were primarily two-dimensional or image metric examples, the present invention is not limited to image metrics. The concept used in the present invention is valid for other than two-dimensional signals i.e. the invention is applicable to one dimensional signals such as radar and to three-dimensional signals such as obtained from a laser sensor.

The characterization of data is an important application of the present invention. In the past the quality of the collected data could not be communicated to another AOR user, because the data was not characterized. Workers who are developing or experimenting with AOR systems to determine the AOR sensitivity or to compare it to another AOR system or for other experimental purposes have a great need for sensor data. To be useful the sensor data must include information about the data. For example if one wants to prove the performance of a segmentation algorithm, one needs data that has the needed variations for testing a segmentation algorithm. In the past one would have to go through the very expensive collection of data that would have the range of variation needed or to go through each frame of a data tape and perform the characterization manually by the use of ground truth information. The present invention can automatically perform the characterization of the sensor data tape.

Another advantage of Applicants' invention is that it automatically extracts signal or image metrics directly from the ATR output. The present invention will be useful with a variety of sensor types.

In accordance with the foregoing description, applicants have developed a signal metric estimator that may be utilized with automatic target recognition systems or automatic object recognition systems.

Although a specific embodiment of the applicant's invention is shown and described for illustrative purposes, a number of variations and modifications will be apparent to those of ordinary skill in the art. It is not intended that coverage be limited to the disclosed embodiment, but only by the terms of the following claims.

The embodiments of an invention in which an exclusive property or right is claimed are defined as follows:

1. A signal metric estimator apparatus comprising:
   automatic target recognition (ATR) means for receiving a plurality of sequential multidimensional signals of a scene, and providing ATR observables, said ATR having a plurality of adjustable parameters;
   ancillary data means for providing non-sensory informational data for said scene;
   performance measure estimating means connected to said ATR means for receiving said ATR observables and connected to said ancillary data means for receiving said non-sensory informational data, said performance measure estimating means providing a first performance measure estimate for said ATR;
   a first performance model as a function of parameters and metrics, said first performance model having coefficients;
   means for varying a first parameter of said ATR from a first value to a second value;
   means for determining a rate of change of a variation in said first performance measure estimate as a result of varying said first parameter from a first value to a second value; and
   inverting means for using said first parameter first value, said rate of change of said variation in said first performance measure estimate, said performance model coefficients, and said first performance model to estimate a first metric value.

2. Apparatus of claim 1 wherein said performance measure estimating means includes means for determining a frequency of a target being tracked exceeding a threshold value.

3. Apparatus of claim 1 wherein said inverting means includes partial differential means for taking a partial derivative of said first performance model with respect to said first parameter.

4. A signal metric estimator apparatus comprising:
   automatic target recognition (ATR) means for receiving a plurality of sequential images of a scene and providing ATR observables, said ATR having a plurality of adjustable parameters;
   ancillary data means for providing non-sensory informational target data for said scene;
   performance measure estimating means connected to said ATR means for receiving said ATR observables and connected to said ancillary data means for receiving said non-sensory informational target data, said performance measure estimating means comparing said ATR observables to said non-sensory informational target data and said performance measure estimating means determining the frequency of tracking of a predicted target, said performance measure estimating means providing a first performance measure estimate for said ATR;
   a first performance model for providing a corresponding model for said first performance measure estimate, said first performance model being a quadratic function of a first parameter of said ATR and of a first metric;
   means for varying said first parameter from a first value to a second value;
   means for determining a rate of a change of said first performance measure estimate as a result of varying said first parameter from a first value to a second value; and
   means for using said first parameter first value, said rate of change of said first performance estimate, said performance model coefficients, and said first performance model to estimate said first metric.

5. Apparatus of claim 4 wherein said means for using said first parameter first value, said rate of change of said first performance estimate, said first performance model coefficients, and said first performance model includes partial derivative means for taking a partial derivative of said first performance model with respect to said first parameter.

6. Apparatus of claim 5 wherein said means for using said first parameter first value, said rate of change of said first performance estimate, said first performance model coefficients and said first performance model includes means for determining an estimated metric from said partial derivative.

7. A signal metric estimator apparatus for use with an Automatic Target Recognition (ATR) system having a plurality of adjustable parameters, said ATR receiving a plurality of sequential images of a scene and providing ATR observables, said signal metric estimator comprising:
   ancillary data means for providing non-sensory information data for said scene;
   performance measure estimating means connected to said ATR for receiving said ATR observables and connected to said ancillary data means for receiving said non-sensor informational data, said performance measure estimating means comparing said ATR observables to said non-sensory informational data and said performance measure estimating means determining the frequency of tracking of a predicted target, said performance measure estimating means providing a first performance measure estimate for said ATR;

a first performance model for providing a corresponding model for said first performance measure estimate, said first performance model being a quadratic function of a first parameter of said ATR and of a first metric;

means for varying said first parameter from a first value to a second value;

means for determining a rate of change of said first performance measure estimate as a result of varying said first parameter from a first value to a second value; and means for using said first parameter first value, said rate of change of said first performance estimate, said performance model coefficients, and said first performance model to estimate said first metric.

8. Apparatus of claim 7 wherein said means for using said first parameter first value, said rate of change of said first performance estimate, said performance model coefficients, and said first performance model includes partial derivative means for taking a partial derivative of said first performance model with respect to said first parameter.

9. Apparatus of claim 8 wherein said means for using said first parameter first value, said rate of change of said first performance estimate, said first performance model coefficients and said first performance model includes means for determining an estimated metric from said partial derivative.

* * * * *